US008391613B2

(12) United States Patent
Zhu (10) Patent No.: US 8,391,613 B2
(45) Date of Patent: Mar. 5, 2013

(54) STATISTICAL ONLINE CHARACTER RECOGNITION

(75) Inventor: Feng Drake Zhu, Beijing (CN)

(73) Assignee: Oracle America, Inc., Redwood City, CA (US)

(*) Notice: Subject to any disclaimer, the term of this patent is extended or adjusted under 35 U.S.C. 154(b) by 918 days.

(21) Appl. No.: 12/494,660

(22) Filed: Jun. 30, 2009

(65) Prior Publication Data

US 2010/0329562 A1  Dec. 30, 2010

(51) Int. Cl.
*G06K 9/62* (2006.01)
(52) U.S. Cl. .................................................. 382/200
(58) Field of Classification Search .................. None
See application file for complete search history.

(56) References Cited

U.S. PATENT DOCUMENTS

| 5,245,672 | A | 9/1993 | Wilson et al. |
| 5,371,808 | A | 12/1994 | Wilson et al. |
| 7,002,491 | B2 | 2/2006 | Robbins |
| 7,174,044 | B2 | 2/2007 | Ding et al. |
| 7,461,348 | B2 | 12/2008 | Clow et al. |
| 2004/0017944 | A1* | 1/2004 | Ding et al. ............. 382/182 |

OTHER PUBLICATIONS

Yong et al, Offline Recognition of Handwritten Chinese Characters Using Gabor Features, CDHMM Modeling and MCE Training, IEEE Publication, 2002, pp. 1053-1056.*
Wang et al, Gabor Filters-Based Feature Extraction for Character Recognition; Pattern Recognition—The Journal of the Pattern Recognition Society, Aug. 2004, pp. 369-379.*
Huo et al. High Performance Chinese OCR Based on Gabor Features, Discriminative Feature Extraction and Model Training, IEEE Publication, 2001, pages cover and 1517-1520.*
Bai, Zhen-Long and Qiang Huo; "A Study on the Use of 8-Directional Features for Online Handwritten Chinese Character Recognition"; Proceedings of the 2005 Eight International Conference on Document Analysis and Recognition; 2005; 5 pages.
Deng, DA, K.P. Chan, and Yinglin Yu; "Handwritten Chinese Character Recognition Using Spatial Gabor Filters and Self-Organizing Feature Maps"; Proceedings of the IEEE International Conference on Image Processing, Part 3 of 3, Austin, TX, Nov. 13-16, 1994; pp. 940-944.
Lim, T.J. and M.D. MacLeod; "On-Line Interpolation Using Spline Functions"; IEEE Signal Processing Letters, vol. 3, No. 5, May 1996; pp. 144-146.
Toscano, L. Karina, Mariko Nakano, Hector Perez, Rocio Toscano, and Makoto Yasuhara; "A System for On-line Handwritten Character Recognition Using Natural Spline Function"; 2004 1st International Conference on Electrical and Electronics Engineering; pp. 172-176.

* cited by examiner

*Primary Examiner* — Brian P Werner
(74) *Attorney, Agent, or Firm* — Meyertons Hood Kivlin Kowert & Goetzel, P.C.; Jeffrey C. Hood (57) ABSTRACT

A statistical system and method for generating patterns and performing online handwriting recognition based on those patterns. A plurality of predetermined patterns may be generated by performing feature extraction operations on one or more character samples utilizing a Gabor filter. An online handwritten character may be acquired. The online handwritten character may be pre-processed. One or more feature extraction operations, utilizing a Gabor filter, may be performed on the online handwritten character to produce a feature vector. One or more patterns may be generated, using a statistical algorithm, for the online handwritten character, based on the feature vector. The online handwritten character may be statistically classified based on a comparison between the one or more patterns generated for the online handwritten character and the plurality of predetermined patterns.

16 Claims, 8 Drawing Sheets

*original input*

FIG. 8A

*after linear size normalization*

FIG. 8B

*after nonlinear shape normalization*

FIG. 8C

*after adding imaginary strokes and points*

FIG. 8D

*after resampling*

FIG. 8E

*after smoothing*

FIG. 8F

STATISTICAL ONLINE CHARACTER RECOGNITION

FIELD OF THE INVENTION

The present invention relates to online character recognition (OLCR).

DESCRIPTION OF THE RELEVANT ART

Many electronic devices and computing applications today include handwriting input (or pen input) as part of their functionality. Pen-based input can be particularly useful, for example, in devices lacking a full keyboard. One possible use includes writing instant messages (IMs) by hand. This provides a more comfortable human-computer interface for some users. In order to accurately translate a handwritten character into a digital character, some form of handwriting recognition is often used. Handwriting recognition is a difficult problem, particularly for languages which have large character sets, such as some Eastern languages.

Handwriting recognition methods are typically subdivided into two categories. Offline Character Recognition involves converting a static representation of handwriting into digital data. Online Character Recognition (OLCR) involves sensing handwritten characters as they are written and converting them to digital characters. In OLCR, information regarding directionality of the handwriting strokes is available for use in the recognition method, whereas in Offline Character Recognition the system generally only receives a static image of the handwriting, without this directionality information. Because more information is available in OLCR than in Offline Character Recognition, OLCR provides more potential to accurately recognize and convert handwritten characters to digital characters. Thus, although either category could be used with pen input devices, OLCR is generally given more attention in this context.

One form of OLCR utilizes structural recognition, which involves analysis based on structural descriptions or representations of the characters. More specifically, structural recognition involves examining the structure of a plurality of symbols in the handwriting, e.g., examines the handwriting as a spatial arrangement of a complex two-dimensional structure. Thus structural analysis may comprise examining the basic symbols, e.g., letters and digits, as well as the binding, fence and operator symbols, their grouping criteria, the explicit or implicit relationship between the symbols in an expression, different meanings of the symbols based on context, etc. A structural analysis method may use a bounding box method to examine information of symbols and sub-expressions in the bounding box for calculating both the distance and the direction between symbols.

Statistical-Structural models are also receiving increasing attention. Statistical-Structural models take most of the same steps as structural recognition, but the structure primitives' relationships are measured probabilistically. In particular, Hidden Markov Models (HMMs) are widely used for Statistical-Structural recognition. Because both structural methods and statistical structural recognition methods are based on complex analysis of a particular character set of a target language, such methods are not very adaptable. For example, a structural or statistical-structural recognition method for Korean characters could not be easily adapted for use with Japanese characters.

Thus, improvements in OLCR are desirable.

SUMMARY OF THE INVENTION

Statistical OLCR methods utilize statistical recognition; in other words, the characters are represented statistically. Unlike structural recognition methods, which bind classification with feature representation, statistical recognition can generate feature patterns using standard statistical techniques. In other words, statistical recognition methods can try new classification techniques (e.g., for a new character set, such as for a new language) without needing to be completely redesigned. Some statistical recognition techniques map the characters into 2D images, then use image pattern recognition techniques. In addition, nowadays some offline recognition methods can be adapted to online recognition (e.g., using directional features of a character's points). Statistical recognition methods bring more flexibility than structural recognition methods, with excellent recognition accuracy, without requiring structural analysis of a character set.

Embodiments of the present invention relate to a statistical handwriting recognition system and method. One embodiment relates to a method for generating patterns for use in online character recognition. In other words, based on a set of pre-identified character samples, a statistical algorithm may train itself to find or generate patterns for each class of character for which there are character samples. The patterns may then be used at a later time for actual character recognition. Thus, another embodiment relates to a method for recognizing handwritten characters using predetermined patterns. Each method may be implemented by a processor executing program instructions stored on a memory medium according to various embodiments.

A method for generating patterns for use in online character recognition may include performing various operations on a first character sample. One or more pre-processing operations may be performed on the first character sample. For example, noise points may be removed from the first character sample. Linear size normalization may be performed on the first character sample. Nonlinear shape normalization may be performed on the first character sample. Imaginary strokes and/or imaginary points may be added to the first character sample. The first character sample may be re-sampled. The first character sample may be smoothed. According to various embodiments, any or all of such operations, or other operations, may be performed on the first character sample, and each operation may be implemented in any number of ways.

One or more feature extraction operations may also be performed on the first character sample. For example, directional features may be extracted based on the direction of each point of the first character sample. Directional pattern images may be generated based on the directional features. The directional pattern images may be filtered using a Gabor filter. A feature vector may be formed based on the filtered directional pattern images. The feature vector may include a plurality of directional vectors. In some embodiments, at least two of the directional vectors may be weighted differently; for example, a first directional vector with a first directionality may be weighted differently than a second directional vector with a second directionality. According to various embodiments, any or all of such feature extraction operations, or other feature extraction operations, may be performed on the first online handwritten character, and each feature extraction operation may be implemented in any number of ways.

Statistical training may be performed to generate patterns based on the feature vector of the first character sample. In some embodiments, the statistical training may be based on the feature vectors of multiple character samples. For example, a statistically significant set of character samples may in some cases be required to generate patterns which will be effective in classifying online handwritten characters. Thus, the above described steps of performing one or more pre-processing operations and one or more feature extraction operations may in some embodiments be performed for a plurality of character samples, and the statistical training may thus be based on a plurality of feature vectors, e.g., including the feature vector generated from the first character sample. Statistical training may include using a clustering algorithm, such as a k-means clustering algorithm.

The patterns generated may be stored in a memory, e.g. on any kind of memory medium. The patterns may be stored in a simple or complex data structure; for example, in one embodiment, the generated patterns may be stored in a pattern database.

A method for recognizing handwritten characters using predetermined patterns may include first generating the predetermined patterns, for example as described above as the method for generating patterns for use in online handwriting recognition, according to various embodiments. Thus, there may be a set of patterns, e.g., a pattern database, for use in recognizing handwritten characters.

A first online handwritten character may be acquired, e.g., directly by a pen-input device, or indirectly by a device coupled to a pen-input device. Acquiring the online handwritten character may include receiving input data collected form at least one input stroke (e.g., one handwriting stroke) in a pen-input device. The online handwritten character may thus comprise one or more strokes, and/or include information about an order in which the points of the online handwritten character were input to the pen-input device. Various operations may then be performed on the first online handwritten character.

One or more pre-processing operations may be performed on the first online handwritten character. For example, noise points may be removed from the first online handwritten character. Linear size normalization may be performed on the first online handwritten character. Nonlinear shape normalization may be performed on the first online handwritten character. Imaginary strokes and/or imaginary points may be added to the first online handwritten character. The first online handwritten character may be re-sampled. The first online handwritten character may be smoothed. According to various embodiments, any or all of such pre-processing operations, or other pre-processing operations, may be performed on the first online handwritten character, and each pre-processing operation may be implemented in any number of ways.

The pre-processing operations performed on the first online handwritten character may be the same pre-processing operations performed on any character samples used in generating the predetermined patterns; thus, any patterns generated from the online handwritten character may have been processed in an equivalent way as the predetermined patterns. Because of this, a comparison between any patterns generated from the online handwritten character and the predetermined patterns may be more effective in classifying the online handwritten character.

One or more feature extraction operations may also be performed on the first online handwritten character. For example, directional features may be extracted based on the direction of each point of the first online handwritten character. Directional pattern images may be generated based on the directional features. The directional pattern images may be filtered using a Gabor filter. A feature vector may be formed based on the filtered directional pattern images. The feature vector may include a plurality of directional vectors. In some embodiments, at least two of the directional vectors may be weighted differently; for example, a first directional vector with a first directionality may be weighted differently than a second directional vector with a second directionality. According to various embodiments, any or all of such feature extraction operations, or other feature extraction operations, may be performed on the first online handwritten character, and each feature extraction operation may be implemented in any number of ways.

The feature extraction operations performed on the first online handwritten character may be the same feature extraction operations performed on any character samples used in generating the predetermined patterns; thus, any patterns generated from the online handwritten character may be based on feature vectors generated in the same way as the feature vectors on which the predetermined patterns are based. Similarly to the possible requirement that the pre-processing steps for both characters samples used in generating the predetermined patterns and online handwritten characters to be recognized be the same, the feature extraction steps for both character samples and online handwritten characters may also need to be the same for accurate classification of online handwritten characters.

One or more patterns for the online handwritten character may be generated using a statistical algorithm. For example, a clustering algorithm such as a k-means clustering algorithm may be used to generate the pattern(s) for the online handwritten character. The statistical algorithm used to generate the pattern(s) for the online handwritten character may be the same statistical algorithm used to generate the predetermined patterns.

The online handwritten character may be classified based on the pattern(s) generated for the online handwritten character and the predetermined patterns. For example, a statistical classifier may be used to determine which class of character the online handwritten character belongs to, based on a statistical comparison of the pattern(s) of the online handwritten character with the predetermined patterns, e.g., in a pattern database, which might include patterns for each character class in a given character set (e.g., a character set of a language). Thus, classifying the online handwritten character may include determining a character corresponding to the online handwritten character. The character (or a digital image of the character) determined to correspond to the online handwritten character may then be replace the online handwritten character, e.g., on a display of a pen-input device which acquired the online handwritten character.

BRIEF DESCRIPTION OF THE DRAWINGS

A better understanding of the present invention can be obtained when the following Detailed Description of the Embodiments is read in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

The following is a glossary of terms used herein:

An "online handwritten character" may include points or pixels of an image which were input by an electronic pen, stylus, mouse, or another such device. An online handwritten character may further include data on the order in which the recorded points were input, and in some cases, other information, such as writing speed and/or pressure, e.g., depending on the input device.

A "character sample" may include data for an online handwritten character as collected from a pen-input device. A character sample may also include an associated digital character corresponding to the online handwritten character. This combination of information (both the online handwritten character and the associated (intended) digital representation of the character) may allow a statistical algorithm to train.

A "memory medium" may include any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a PROM, EPROM, EEPROM, flash memory, or magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

A "computer System" may include any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Figure 1A:
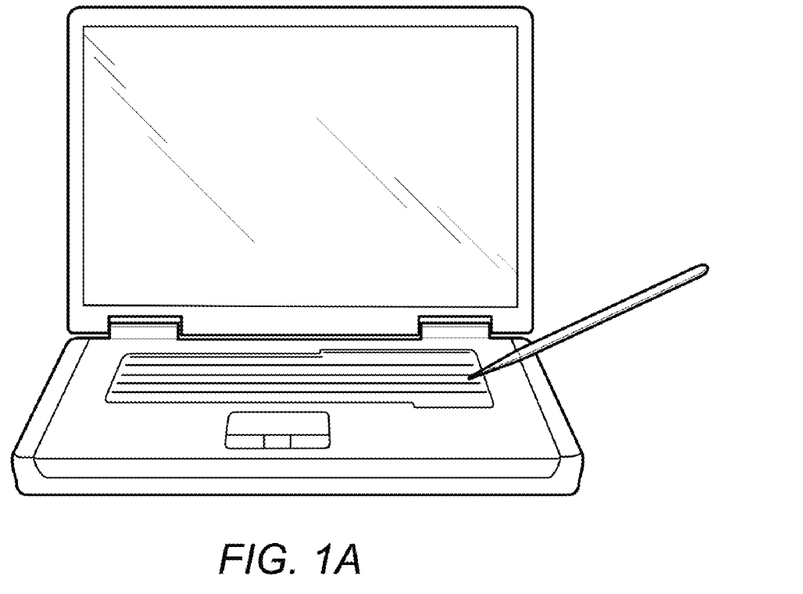
FIGS. 1A and 1B illustrate exemplary devices which are operable to receive pen-based input and may include a handwriting recognition implementation according to one embodiment of the invention.
Figure 1B:
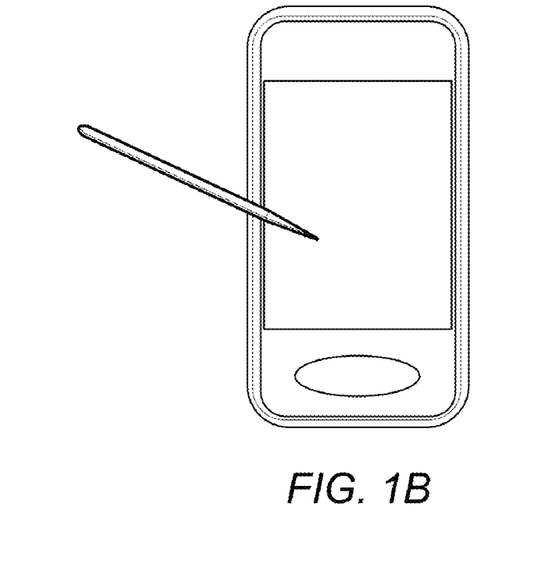

FIGS. 1A and 1B—Exemplary Pen-Input Devices

FIG. 1A and 1B illustrate exemplary devices which are operable to receive handwriting input from a user. A "pen-input device" may be any device which is operable to receive pen-based input from a user. Some examples may include Personal Digital Assistants (PDAs), mobile or cellular telephones, smart phones, hand-held computing systems (e.g. "tablet PCs" or "Palm-Tops"), and other communication devices. Other pen-input devices may be any devices or systems that include a display and allow users to input information using an electronic pen or stylus and can process said input. A device that can process information input by an electronic pen or stylus, even if the device cannot directly receive pen-input, although not strictly pen-input devices, may also be able to perform some or all of the methods described herein.

Figure 2:
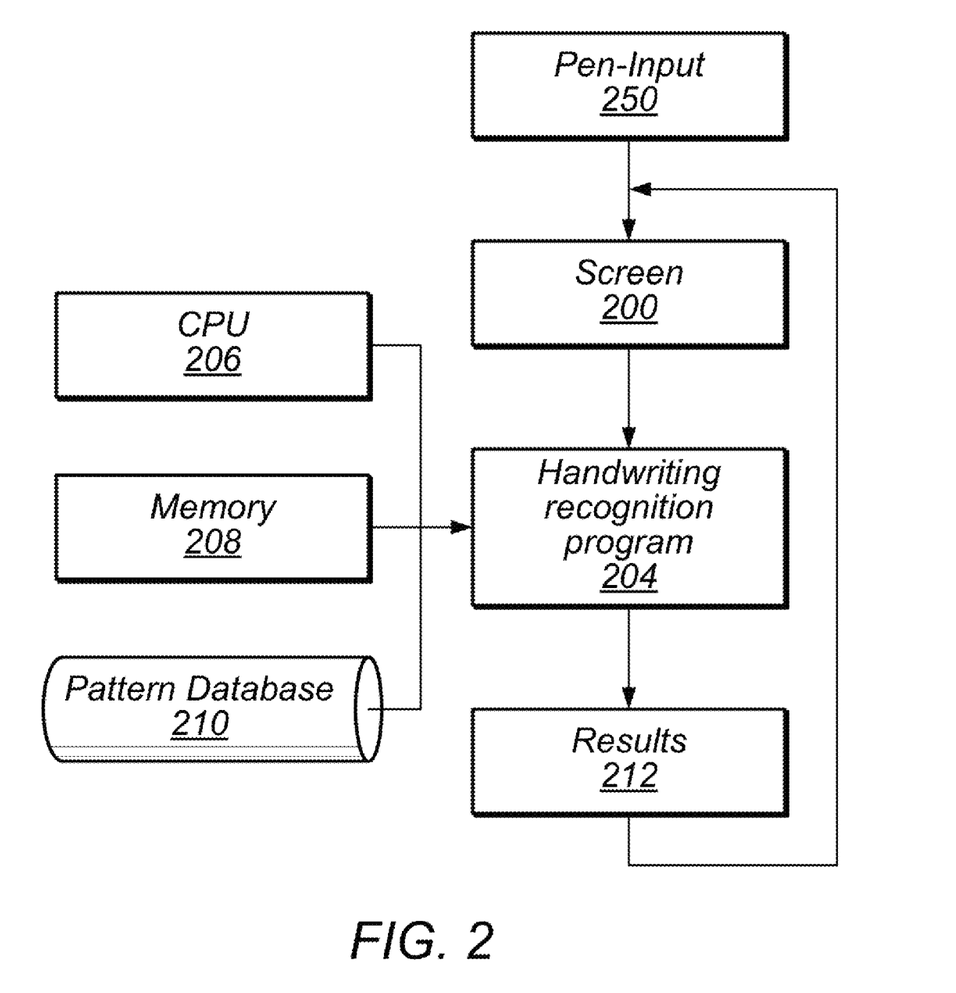
FIG. 2 is a block diagram of a device which is operable to receive pen-based input and includes a handwriting recognition implementation according to one embodiment of the invention.

FIG. 2—Block Diagram of a Device that Performs Handwriting Recognition

FIG. 2 is a system diagram of a device that performs handwriting recognition according to one embodiment. The device may include a screen or monitor, such as screen 200, which is configured to receive pen-input 250, e.g., an online handwritten character. An online handwritten character received via the pen-input 250 on the screen 200 may be input to a handwriting recognition program 204, which may perform OLCR on the online handwritten character according to an embodiment of the method for recognizing online handwritten characters described herein with respect to FIG. 7. The handwriting recognition program 204 may execute on processor 206, e.g., from program instructions stored on memory medium 208. The handwriting recognition program 204 may also make use of a pattern database 210, such as might be developed using an embodiment of the method for developing statistical recognition patterns described herein with respect to FIG. 3. The handwriting recognition program 204 may return a result 212 for the online handwritten character, such as a digital character corresponding to the online handwritten character. The result 212 (e.g., the digital character) may then be displayed on the screen 200; for example, an image of the resulting digital character may replace an image of the online handwritten character on which the digital character is based.

While FIG. 2 represents one exemplary embodiment of a device that performs handwriting recognition, it should be noted that any number of other embodiments are also possible. For example, the device which performs the handwriting recognition (e.g., including a handwriting recognition program) may be a different device than the device which receives the pen-input. Thus, a first device might receive an online handwritten character, and provide that online handwritten character to a second device, which might perform OLCR and return a result, which the second device could then provide back to the first device. The two devices might communicate over a network, or in any of various ways. Thus, embodiments of the methods described herein may be implemented partially or entirely by any of various devices.

Figure 3:
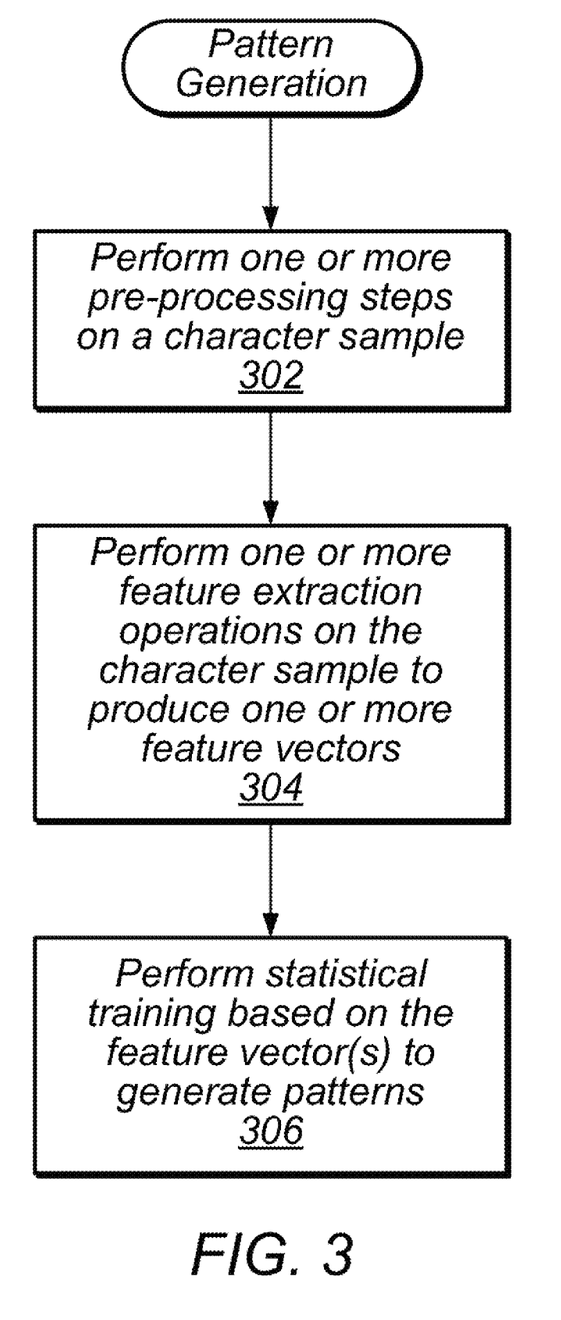
FIG. 3 is a flowchart diagram illustrating a method for developing statistical recognition patterns for use in recognizing online handwritten characters.

FIG. 3—Method for Developing Statistical Recognition Patterns for Use in Recognizing Online Handwritten Characters FIG. 3 illustrates a flowchart diagram of a method for developing statistical recognition patterns for use in recognizing online handwritten characters according to one embodiment.

In 302 one or more pre-processing steps may be performed on a character sample. In general, pre-processing a character sample may reduce or remove some variations that may occur between character samples of the same class. Reducing such variations may provide an improvement in recognition accuracy. According to various embodiments, the pre-processing steps may include one or more of: removing noise points, normalizing the character sample to a particular dimension, performing nonlinear shape normalization on the character sample, adding imaginary strokes and imaginary points to the character sample, re-sampling the character sample, and/or performing smoothing on the character sample. More detail with respect to each of these pre-processing steps is presented below in conjunction with FIG. 4.

After pre-processing in 302, in 304 one or more feature extraction operations may be performed on the character sample. Extracting features from a character sample may allow for patterns to be generated. The qualities of the extracted features may have a significant effect on the patterns generated and thus on the accuracy of an online handwriting character recognition method utilizing said patterns. According to various embodiments the feature extraction operations may include one or more of: determining a direction for each of the character sample's points, extracting directional features based on the determined directions, generating directional pattern images, applying a Gabor Filter to the directional pattern images, and/or generating a feature vector. More detail with respect to each of these feature extraction steps is presented below in conjunction with FIG. 5.

In 306 statistical training may be performed based on the feature vector(s) to generate patterns. The generated patterns may be usable for performing online handwriting recognition. According to various embodiments the statistical training may include determining a number of classes of training, generating seeds for clustering, and training the statistical recognition model using clustering techniques. After training a pattern database may be generated to be used for recognition. More detail with respect to each of these statistical training steps is presented below in conjunction with FIG. 6.

Figure 4:
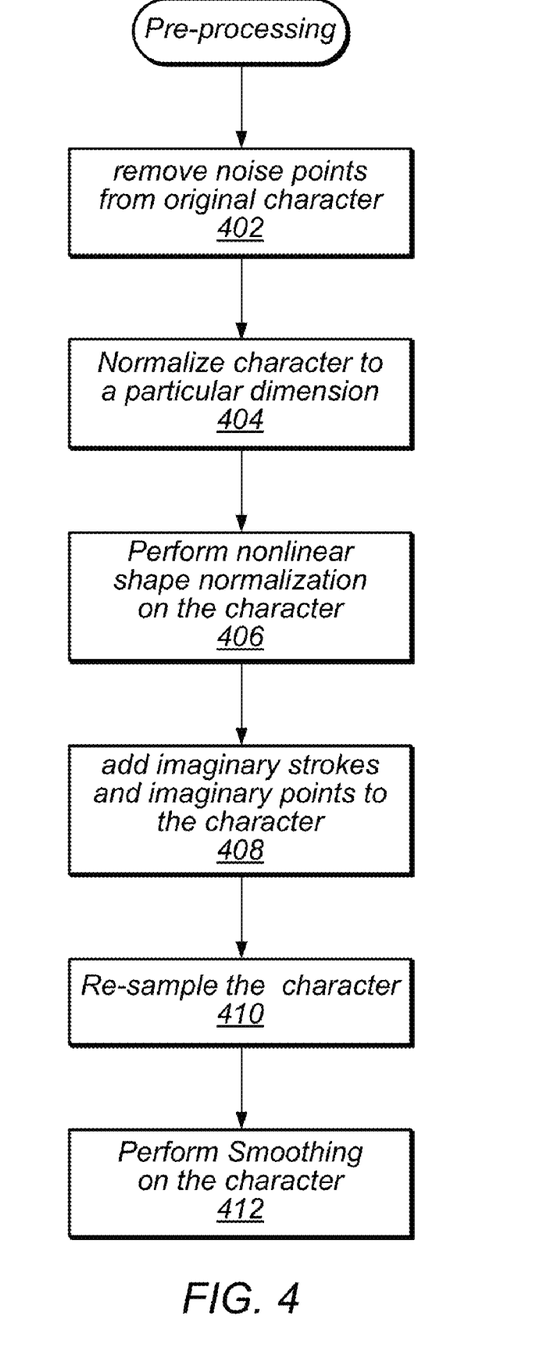
FIG. 4 is a flowchart diagram illustrating pre-processing of a character sample according to one embodiment of the invention.

FIG. 4—Pre-Processing

According to some embodiments one or more pre-processing steps may be performed on a character sample or online handwritten character (the term "character" may be used in this section to refer to either a character sample or an online handwritten character). The steps shown in FIG. 4 and described below may be performed in the order shown, however, alternate orders may also be possible In 402, noise points may be removed from original character. Noise points may include strokes with one, two, or some small number of points, e.g., such that it is likely that they are not intended to be part of the input by the user. Removing noise strokes and noise points may reduce interference from a users' careless or accidental input.

In 404, the character may be normalized to a particular dimension. The normalization may utilize an aspect-ratio preserved linear mapping. In other words, the character may be re-sized to a standardized image size without changing the original aspect-ratio. The particular dimension to which the character is mapped may for example be a 64×64 bitmap. Other dimensions are also envisioned.

In 406, non-linear shape normalization (NSN) may be performed on the character. NSN may further reduce character deformation due, for example, to the handwritten nature of the character. NSN is used to process character shapes which linear normalization pre-processing doesn't account for; for example, a very long stroke, or a character which has a very large width/height ratio. NSN can be divided into two types, dot-density and line-density. Dot-density NSN adjusts the point position according to the dot density of a character, with the X/Y axes. Line-density NSN use line density, with two directions, to determine the new points' positions. In a preferred embodiment, the NSN method used may be dot-density NSN. However, in some alternate embodiments, line-density NSN may be used instead of or in addition to dot-density NSN.

In 408, imaginary strokes and imaginary points may be added to the character. Imaginary strokes are any pen moving trajectories while the pen is in pen-up state, e.g. while the pen is not touching a pen-input-sensitive surface. An imaginary stroke may be added to the character as a direct line between the last point of a pen-down stroke and the first point of the following pen-down stroke. Other forms (e.g. curved) of imaginary strokes may be used in place of or in addition to direct lines in some embodiments. Imaginary points may reduce the effects of stroke number variation, which may occur, for example, due to different users' writing habits. For example, very fluid or cursive styles can reduce the number of strokes of a character. Adding imaginary points to some characters to achieve more uniform strokes among a plurality of characters may improve the accuracy of character recognition.

In 410, the character may be re-sampled. Re-sampling may balance the distance variation between any two given on-line points so as to reduce the variance in number of points in a stroke and the effects of dot density variation, which may occur, for example, due to different sample collection devices. In other words, different pen-input devices may produce character images with varying dot densities. Re-sampling may also reduce the total number of points in a character to reduce the calculation overhead. Re-sampling may include removing points at a particular interval if the density is very high, and/or adding additional points in the case where the distance between two neighboring points is larger than a certain threshold. Re-sampling may be performed for both original and imaginary strokes.

In 412, smoothing may be performed on the character. Smoothing may reduce stroke shape variation in a small local region of the bitmap. It may include adjusting the coordinates of the original points according to the neighboring points in two directions for all original and imaginary strokes. In particular, spline methods may be particularly effective in smoothing for the purposes of OLCR, potentially providing more accurate character recognition. A spline function for interpolation would normally be determined to minimize some suitable measure of roughness (e.g., integral squared curvature) subject to any interpolation constraints. Smoothing splines, then, may be viewed as generalizations of interpolation splines, where the spline functions may be determined in such a way as to minimize a weighted combination of an average squared approximation error over observed data and the roughness measure.

Figure 5:
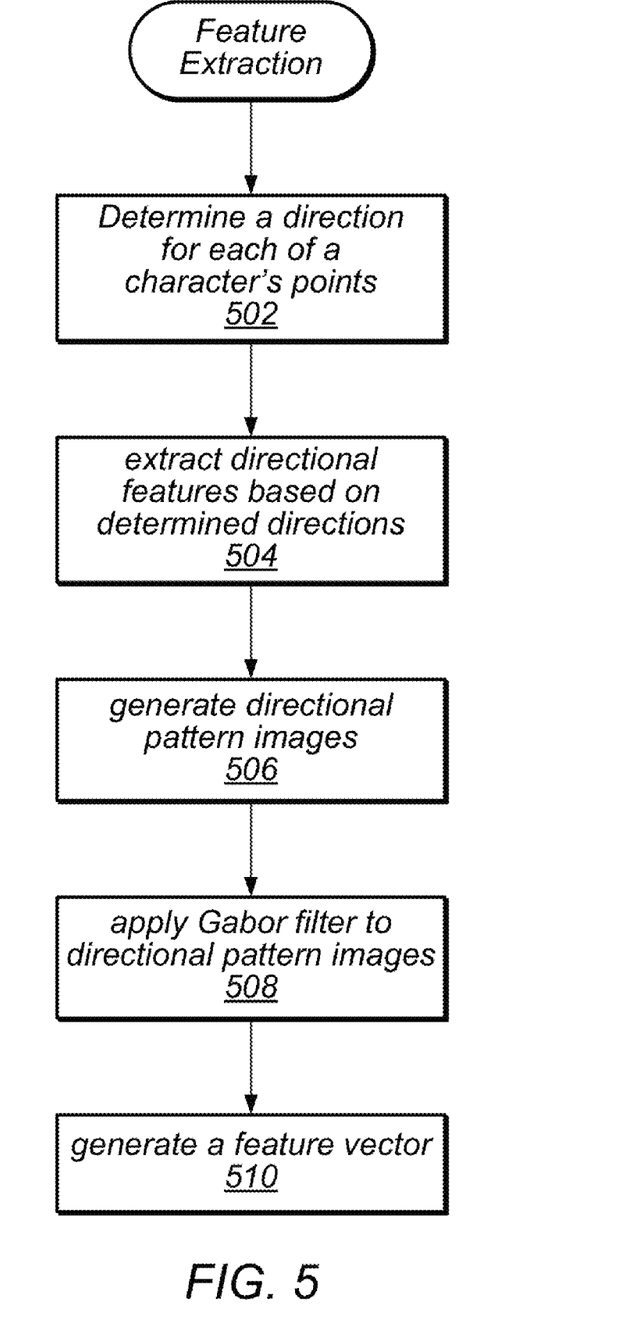
FIG. 5 is a flowchart diagram illustrating extracting features of a character sample according to one embodiment of the invention.

FIG. 5—Feature Extraction

According to some embodiments features may be extracted from a character sample or online handwritten character (the term "character" may be used in this section to refer to either a character sample or an online handwritten character). The character may have been pre-processed, e.g., using an embodiment of the method described above with respect to FIG. 4, or in another way. The feature extraction process may involve several steps; FIG. 5 illustrates an exemplary set of steps in a feature extraction process according to one embodiment. The steps shown in FIG. 5 and described below may be performed in the order shown, however, alternate orders may also be possible.

In 502 a direction for each of the character's points may be determined. The directional information for each point in the character may be determined based on the input collected by the pen-input device which collected the given character. For example, if the pen-input device records the order in which the points for a given stroke were made, the direction of a given point in a character may be determined by constructing a vector pointing from the previously input point to the following input point. Other ways of determining direction may also be possible; for example, rather than constructing a vector from the previously input point to the input point following a given point, a vector may be constructed between the previously input point and the given point itself Alternate methods may also or alternatively be used for the first and last points of a given stroke.

In 504 directional features may be extracted based on the determined direction of each point of the character. A directional feature may be a vector in a given directional space, the vector having components of one or more of the directions in the directional-space. The directional space may be 8-directional. In other words, there may be 8 possible directional components to the directional feature vector. The 8 directions may correspond, for example, to the directions of a compass: N, NE, E, SE, S, SW, W, and NW. Thus, one point's directional feature may be the two directions for which it includes components, for example, NW and N. Other directional spaces may also be possible, for example 4-directional space utilizing, to continue the simile with compass points, N, E, S, and W. Additional directional spaces are also possible.

In 506 directional pattern images of the extracted features may be generated. In this step each point may be assigned to one or more directional pattern images based on its directional feature. For example, a point whose directional feature is NW and N may be assigned to a NW pattern image and to a W pattern image. Generally, n directional pattern images may be generated if n-directional space is used; thus, if 8-directional space is used, 8 directional pattern images may be generated. Each directional pattern image may include the points assigned to it based on their directional features. In other words, a NW pattern image may include all the points which include a NW directional feature, while the S pattern image may include all the points which include an S directional feature. It should be noted that each point may be included in two directional pattern images, e.g., each of the directional pattern images corresponding to a given point's directional features.

In 508 a Gabor filter may be applied to the directional pattern images. A Gabor filter is a linear filter whose impulse response is defined by a harmonic function multiplied by a Gaussian function. Each image (e.g., each online handwritten character or character sample) may be divided into grids, such as 8×8 pixel grids. By applying a Gabor filter to each grid, more uniform features may be produced, thereby reducing the vector space. A Gabor filter can provide more control parameters than, for example, a Gaussian filter. This may enhance the capability of the model to be tuned, potentially producing an improved overall method.

In 510 a feature vector may be generated. The feature vector may be based on the above described steps. For example, based on the original 8-directional 64×64 pixel image, 8 directional pattern images may be produced, following which the image may be divided into 64 (8×8) 8×8 pixel grids, each filtered by a Gabor filter. As a result, an 8×8× 8=512 dimensional feature vector may be produced. In other words, each of the 64 (8×8) grids in the 64×64 pixel may have 8 directional pattern images. In one embodiment, these directional pattern images may be represented as floating point numbers, thus each grid may have one or more floats, and thus the feature vector may be composed of these floats, which may thus be processable using classification (e.g., statistical classification) methods. In some embodiments, a non-linear process such as evolution may be used with the feature vector to amplify the small features and lessen the big features. It should be noted that other types of feature vectors (e.g., with other dimensionality) are also possible).

Figure 6:
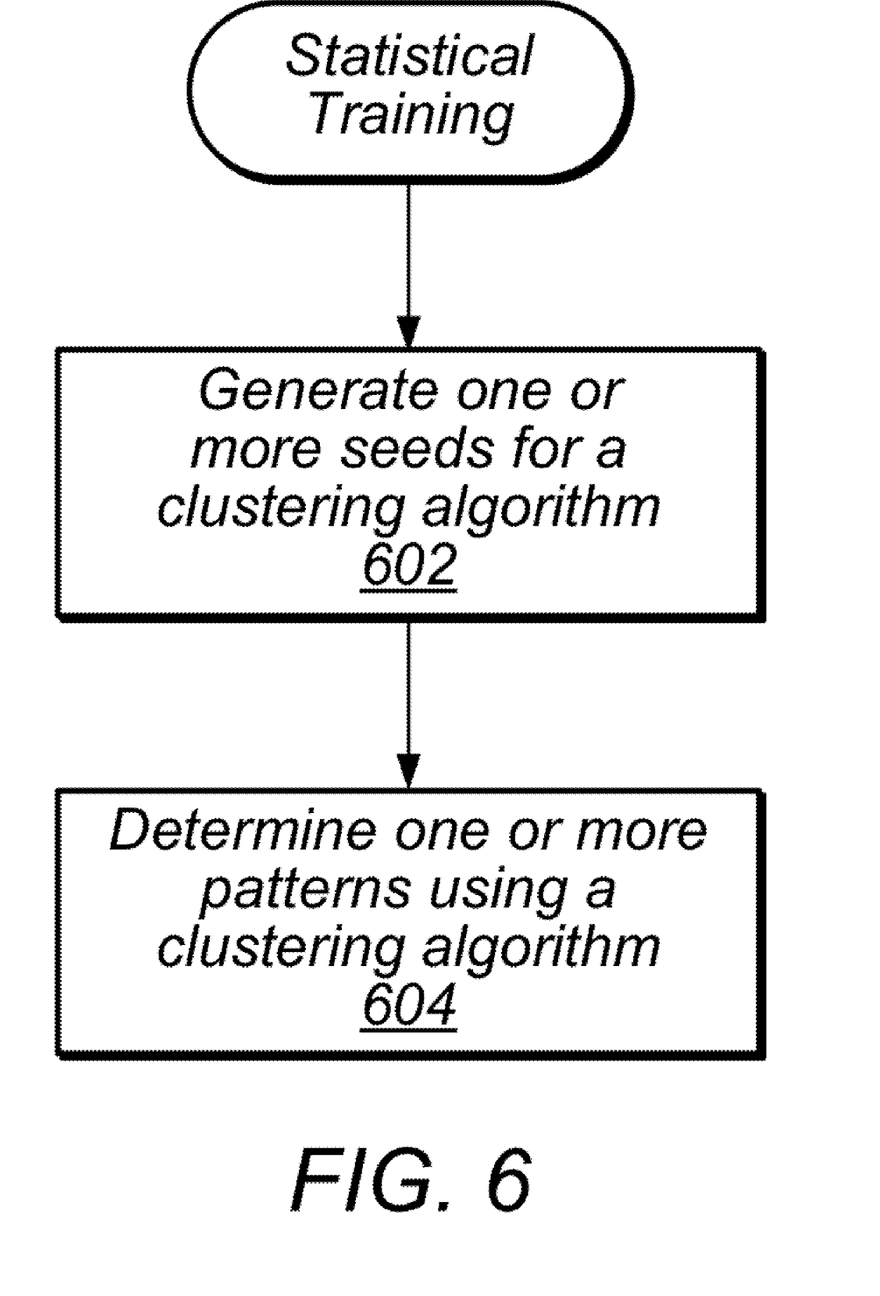
FIG. 6 is a flowchart diagram illustrating statistical training of a character recognition method according to one embodiment of the invention.

FIG. 6—Statistical Training

FIG. 6 is a flowchart diagram of a method for performing statistical training in order to generate patterns for use in online handwriting recognition according to one embodiment. The statistical training may be based on the feature vectors (e.g., as extracted according to an embodiment of the method described above with respect to FIG. 5) for the character samples in a given character class. That is to say, a statistical method may be used to generate representative patterns for each type of character in a given character set (e.g., a given language). The generated patterns may then be used to classify an online handwriting character, e.g., to recognize what character the online handwriting character is meant to be. The steps shown in FIG. 6 and described below may be performed in the order shown, however, alternate orders may also be possible.

In 602, one or more seeds may be generated for a clustering algorithm. In one embodiment, the seeds may be determined using spectral clustering. In spectral clustering, a similarity matrix may be constructed using some measure of similarity; the similarity matrix may then be used to generate the seeds for clustering using a clustering algorithm such as a k-means clustering algorithm.

In 604, a clustering algorithm may be used to determine one or more patterns. In one embodiment, a k-means clustering algorithm may be used. K-means clustering involves assigning each point in a feature vector to the nearest (i.e., by some measure of distance, such as Euclidean distance) of one of k clusters. Initially, each of the k clusters may be centered based on one of the seeds generated in step 602. After all the points have been assigned to clusters, new cluster-centers may be determined, and one or more points may be re-assigned, e.g., if the distance from a point to its cluster-center is greater than the distance from the point to another cluster-center. This process may be re-iterated until one or more convergence criteria are met. Thus, k clusters (or patterns) may be produced. K-means clustering may be simple and fast, and may be particularly well suited to handwriting data, especially when used in combination with spectral clustering to generate initial seeds. For many languages, 3 or 4 patterns (e.g., k may be 3 or 4) for each character class may be sufficient for handwriting recognition. However, it should be noted that other numbers of patterns (e.g., k values) are also possible, and may be desirable in some cases.

In some embodiments, the distance between points in a feature vector may be weighted for clustering purposes. For example, each different directional pattern image may not have an equal effect on character recognition; for example, the NW direction may be relatively important. Thus, two or more different directional vector in a feature vector may be given a different weight, e.g., based on the directionality of those vectors. If directional weighting is used in generating patterns, for best results, the same directional weighting may also need to be used in classifying (e.g., recognizing) online handwritten characters.

Figure 7:
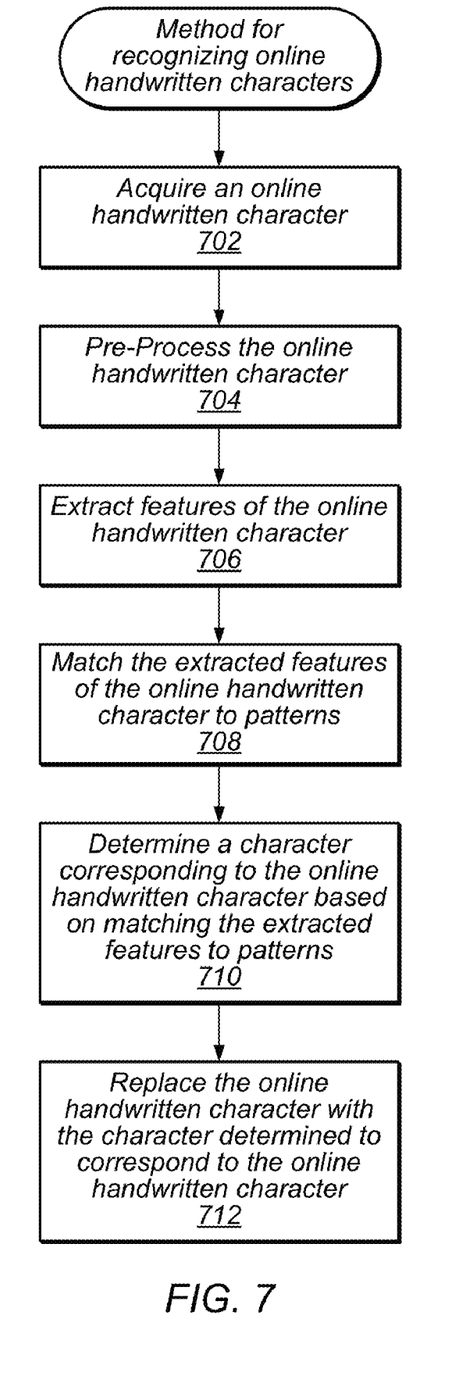
FIG. 7 is a flowchart diagram illustrating a method for recognizing online handwritten characters.

FIG. 7—Method for Recognizing Online Handwritten Characters

FIG. 7 illustrates a method for recognizing online handwritten characters according to one embodiment.

In 702 an online handwritten character is acquired. The online handwritten character may be acquired from input from an electronic pen or stylus in a pen-input device such as the device of FIG. 1. Alternatively, the online handwritten character may be acquired from another device, e.g. over a network or the internet, and may have been input in a different device. Once acquired, the online handwritten character may be stored (e.g. on a memory medium) for processing and/or recognition, or may be processed and/or recognized immediately.

In 704 the online handwritten character is pre-processed. This process may be similar or identical to the process illustrated in FIG. 4 and described above. It may be important (e.g., in order to obtain a high accuracy rate) that the pre-processing steps taken in 704 be the same pre-processing steps taken to generate the patterns used to recognize the character (e.g., in step 708 and 710).

In 706 features are extracted from the online handwritten character. This process may be similar or identical to the process illustrated in FIG. 5 and described above. Again, it may be important (e.g., in order to obtain a high accuracy rate) that the feature extraction steps taken in 706 be the same feature extraction steps taken to generate the patterns used to recognize the character (e.g., in step 708 and 710).

In 708 the extracted features are matched to patterns. The patterns may have been previously generated, for example by the method illustrated in FIG. 3 and described above with respect thereto. The patterns may have been generated on the device performing the online handwritten character recognition, or alternatively, may have been generated on another device. In such a case the patterns may be imported to the device performing the online handwritten character recognition, or alternatively, may be accessed on another device by the device performing the online handwritten character recognition. For example, the patterns may be stored in one or more pattern databases, locally and/or remotely to the device performing the online handwritten character recognition.

In 710 a character corresponding to the online handwritten character is determined based on matching the extracted features to patterns. The determined character may be chosen from a character set, for example a character set corresponding to a language, such as Chinese, Japanese, Korean, etc. Alternatively the character set may encompass multiple languages' character sets, or partial character sets from one or more languages. The determined character may be chosen as the "best-fit" character as determined by matching the extracted features to patterns, e.g., in the pattern database, where the "best-fit" may be determined in any number of ways, e.g. using any kind of statistical classification algorithm.

In 712, the online handwritten character may be replaced with the digital character determined to correspond to the online handwritten character. As noted above, the online handwritten character may be stored after acquisition. Once the digital character corresponding to the online handwritten character has been determined, it may no longer be necessary to store the online handwritten character itself. Thus, in some embodiments the online handwritten character may be replaced in memory by the determined corresponding digital character, or simply discarded. Alternatively, the online handwritten character may continue to be stored, e.g., with the determined corresponding digital character as a character sample.

A pen-input device may be capable of displaying an image of the online handwritten character as the online handwritten character is being input. After the digital character corresponding to the online handwritten character is determined, the pen-input device may replace the image of the online handwritten character with an image of the corresponding digital character in some embodiments. Alternatively, the pen-input device may not display an image of the online handwritten character as it is input, but may display an image of the corresponding digital character after it has been determined.

FIGS. 8A-8F—Pre-Processing

Figure 8A:
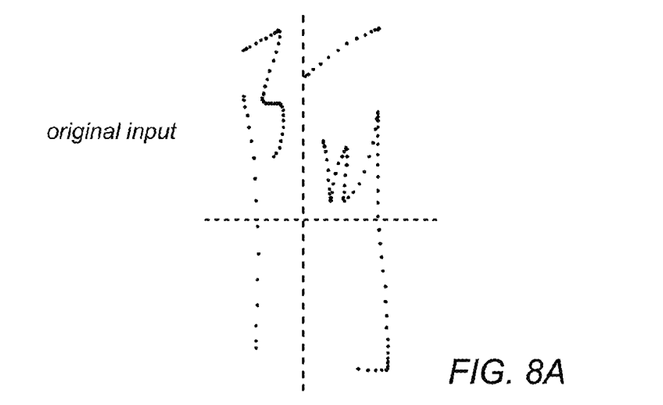
FIG. 8 illustrates an exemplary online handwritten character after each of a series of successive preprocessing steps according to one embodiment.
Figure 8B:
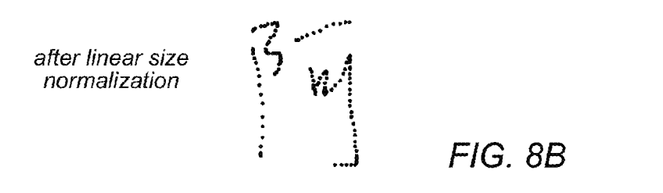
Figure 8C:
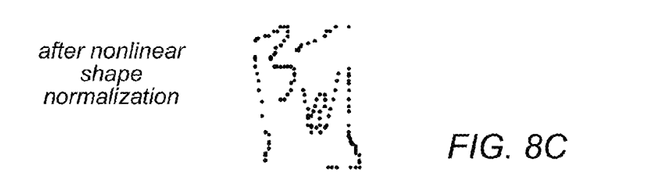
Figure 8D:
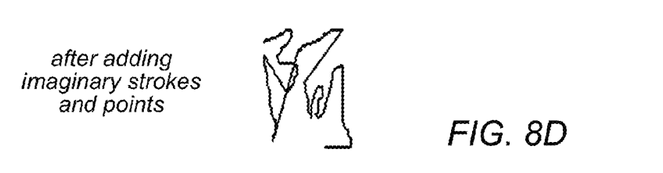
Figure 8E:
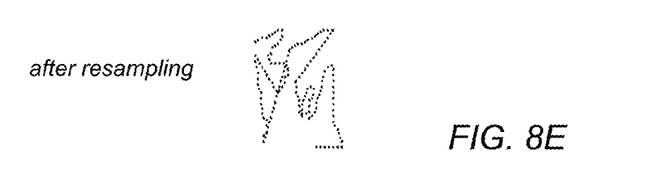
Figure 8F:
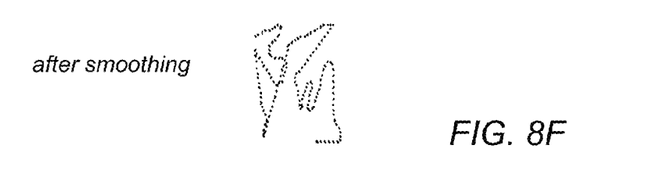

FIGS. 8A-8F show an exemplary online handwritten character after each of a sequence of successive pre-processing steps such as described with respect to FIG. 4. The handwritten character may be either a character sample (e.g., an online handwritten character corresponding to a known character class) or a simple online handwritten character (e.g., which has not been classified as a particular class of character). Thus, the online handwritten character is shown in FIG. 8A as initially input. In FIG. 8B, the online handwritten character is shown as after normalization. FIG. 8C shows the online handwritten character after the successive step of nonlinear normalization has been performed. The online handwritten character is then shown in FIG. 8D as after successive steps of adding imaginary strokes and points; and in FIG. 8E the online handwritten character of FIG. 8D after an additional resampling operation is shown. Finally, FIG. 8F shows the online handwritten character of 8E (i.e., which has undergone each of the previous pre-processing operations) after a final smoothing operation. After the various pre-processing steps, the online handwritten character may be optimally suited for further steps, e.g., feature extraction and either pattern generation or character recognition. It should be noted that the pre-processing steps shown in FIGS. 8A-8F are exemplary only; in some embodiments, one or more steps shown may be omitted, repeated, or performed in a different order, and/or one or more other steps (not shown) may be performed in addition.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for generating patterns for use in online character recognition, the method comprising:
performing one or more pre-processing operations on a character sample;
performing one or more feature extraction operations on the character sample, wherein the one or more feature extraction operations produce a feature vector for the character sample, wherein said performing the one or more feature extraction operations utilizes a Gabor filter, wherein the one or more feature extraction operations comprise:
extracting directional features based on the direction of the character sample's points;
generating directional pattern images based on the directional features;
filtering the directional pattern images using a Gabor filter; and
forming the feature vector based on the filtered directional pattern images;
performing statistical training to generate patterns based on the feature vector of the character sample;
storing the patterns in a memory, wherein the patterns are configured to be used to recognize handwritten characters.

2. The method of claim 1,
wherein the one or more pre-processing operations comprise adding imaginary strokes and adding imaginary points.

3. The method of claim 1,
wherein the one or more pre-processing operations comprise three or more of: noise point removal, linear size normalization, nonlinear shape normalization, adding imaginary strokes, and adding imaginary points.

4. The method of claim 1, wherein the one or more pre-processing operations comprise noise point removal, linear size normalization, nonlinear shape normalization, adding imaginary strokes, adding imaginary points, re-sampling, and smoothing.

5. The method of claim 1, wherein the statistical training comprises a k-means clustering algorithm.

6. The method of claim 1, wherein the statistical training comprises a clustering algorithm.

7. The method of claim 6, wherein the feature vector comprises a plurality of directional vectors, wherein at least two of the directional vectors are weighted differently.

8. A memory medium comprising program instructions for generating patterns for use in online character recognition, wherein the program instructions are executable to:
perform one or more pre-processing operations on a character sample;
perform one or more feature extraction operations on the character sample, wherein the one or more feature extraction operations produce a feature vector for the character sample, wherein said performing the one or more feature extraction operations utilizes a Gabor filter, wherein in performing the one or more feature extraction operations, the program instructions are executable to:
extract directional features based on the direction of the character sample's points;
generate directional pattern images based on the directional features;
filter the directional pattern images using a Gabor filter; and
form the feature vector based on the filtered directional pattern images;
perform statistical training to generate patterns based on the feature vector of the character sample;
store the patterns in a memory, wherein the patterns are configured to be used to recognize handwritten characters.

9. The memory medium of claim 8, wherein the one or more pre-processing operations comprise adding imaginary strokes and adding imaginary points.

10. The memory medium of claim 8, wherein the one or more pre-processing operations comprise three or more of: noise point removal, linear size normalization, nonlinear shape normalization, adding imaginary strokes, and adding imaginary points.

11. A method for recognizing handwritten characters using predetermined patterns, comprising:
generating the plurality of predetermined patterns, wherein the plurality of predetermined patterns are generated by performing one or more feature extraction operations on the character sample utilizing a Gabor filter, wherein the plurality of predetermined patterns are stored in a memory;
acquiring an online handwritten character;
pre-processing the online handwritten character;
extracting features of the online handwritten character, thereby determining a feature vector, wherein extracting features of the online handwritten character to determine the feature vector comprises:
extracting directional features based on the direction of the character sample's points;
generating directional pattern images based on the directional features;
filtering the directional pattern images using a Gabor filter; and
forming the feature vector based on the filtered directional pattern images;
generating, using a statistical algorithm, one or more patterns for the online handwritten character based on the feature vector;
classifying the online handwritten character, comprising determining a character corresponding to the online handwritten character based on the generated one or more patterns and the plurality of predetermined patterns.

12. The method of claim 11, wherein the plurality of predetermined patterns are generated based on a statistical character recognition method.

13. The method of claim 11, wherein said generating the plurality of predetermined patterns comprises:
performing one or more pre-processing operations on a character sample;
performing one or more feature extraction operations on the character sample, wherein the one or more feature extraction operations produce a feature vector for the character sample, wherein said performing the one or more feature extraction operations utilizes a Gabor filter;
performing statistical training to generate patterns based on the feature vector of the character sample;
storing the plurality of predetermined patterns in the memory, wherein the plurality of predetermined patterns are configured to be used to recognize handwritten characters.

14. The method of claim 11, wherein said acquiring the online handwritten character comprises receiving input data collected from at least one input stroke in a pen-input device.

15. The method of claim 11, wherein the online handwritten character comprises one or more strokes.

16. The method of claim 11, wherein the online handwritten character includes information about an order in which the points of the online handwritten character were input.

* * * * *